US012618456B2

(12) United States Patent
Baeumler et al.

(10) Patent No.: US 12,618,456 B2
(45) Date of Patent: May 5, 2026

(54) ROLLER-MOUNTED MOTOR VEHICLE DRIVE UNIT

(71) Applicant: Bayerische Motoren Werke Aktiengesellschaft, Munich (DE)

(72) Inventors: Richard Baeumler, Munich (DE); Tobias Riesch, Lenggries (DE); Michael Staake, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/992,236

(22) PCT Filed: Jul. 18, 2023

(86) PCT No.: PCT/EP2023/069918
§ 371 (c)(1),
(2) Date: Jan. 8, 2025

(87) PCT Pub. No.: WO2024/037809
PCT Pub. Date: Feb. 22, 2024

(65) Prior Publication Data
US 2026/0016068 A1 Jan. 15, 2026

(30) Foreign Application Priority Data
Aug. 17, 2022 (DE) ...................... 10 2022 120 760.9

(51) Int. Cl.
| | |
|---|---|
| *F16H 1/20* | (2006.01) |
| *F16H 57/031* | (2012.01) |
| *F16H 57/037* | (2012.01) |

(52) U.S. Cl.
CPC ............. *F16H 1/20* (2013.01); *F16H 57/031* (2013.01); *F16H 57/037* (2013.01)

(58) Field of Classification Search
CPC ................. F16H 57/031; F16H 57/037; F16H 2057/0216; F16H 2057/0235;
(Continued)

(56) References Cited

U.S. PATENT DOCUMENTS

| | | |
|---|---|---|
| 5,609,072 A | 3/1997 | Lequis et al. |
| 9,951,850 B2 * | 4/2018 | Kramer ................. F16H 37/043 |

(Continued)

FOREIGN PATENT DOCUMENTS

| | | | |
|---|---|---|---|
| CN | 105757210 A | 7/2016 | |
| CN | 110873168 A * | 3/2020 | ......... F16H 57/0457 |

(Continued)

OTHER PUBLICATIONS

International Search Report (PCT/ISA/210) issued in PCT Application No. PCT/EP2023/069918 dated Sep. 25, 2023 with English translation (5 pages).

(Continued)

*Primary Examiner* — Thomas C Diaz
(74) *Attorney, Agent, or Firm* — Crowell & Moring LLP

(57) ABSTRACT

A motor vehicle drive system has a traction transmission device. A traction transmission drive shaft is rotatably mounted in a transmission device housing. A traction transmission intermediate shaft is rotatably mounted in the transmission housing. A traction transmission output shaft is rotatably mounted in the transmission housing device, and is arranged axially parallel to and radially spaced apart from the two other traction transmission shafts. The motor vehicle drive system is characterized in that three traction transmission shafts are each mounted in the traction transmission housing device with a fixed/floating bearing, these bearings each having a fixed bearing for absorbing axial forces and at least one floating bearing designed exclusively to absorb radial forces. The three fixed bearings are mounted in the
(Continued)

traction transmission cover, and at least three of the floating bearings are mounted in the traction transmission housing.

5 Claims, 3 Drawing Sheets

(58) Field of Classification Search
CPC . F16H 2057/02052; F16H 2057/02043; F16H 2057/02034; B60K 17/165; B60K 17/08; B60K 17/12
See application file for complete search history.

(56) References Cited

U.S. PATENT DOCUMENTS

| | | | | |
|---|---|---|---|---|
| 11,235,660 B2 * | 2/2022 | Engerman | .............. | B60K 17/02 |
| 11,300,193 B2 * | 4/2022 | Li | ......................... | F16H 57/021 |
| 11,865,908 B2 * | 1/2024 | Lutz | ......................... | B60K 1/02 |
| 12,072,015 B2 * | 8/2024 | Labelle | ................. | F16H 57/021 |
| 2005/0109567 A1 | 5/2005 | Baumann et al. | | |
| 2021/0083546 A1 | 3/2021 | Garcia et al. | | |
| 2022/0099168 A1 | 3/2022 | Lee et al. | | |

FOREIGN PATENT DOCUMENTS

| | | | |
|---|---|---|---|
| CN | 213017552 U | 4/2021 |
| DE | 44 40 742 C1 | 4/1996 |
| DE | 694 04 768 T2 | 2/1998 |
| DE | 103 49 078 A1 | 5/2005 |
| DE | 10 2019 127 242 A1 | 4/2021 |
| EP | 3 937 353 A1 | 1/2022 |
| JP | 2001-190042 A | 7/2001 |
| WO | WO 2021/054938 A1 | 3/2021 |

OTHER PUBLICATIONS

German-language Written Opinion (PCT/ISA/237) issued in PCT Application No. PCT/EP2023/069918 dated Sep. 25, 2023 with English translation (10 pages).

German-language Search Report issued in German Application No. 10 2022 120 760.9 dated Mar. 6, 2023 with partial English translation (12 pages).

"Waelzlagertechnik Erkrath", SNR Group Bearing Technology, 2004, pp. 119-120, vol. 2 (4 pages).

* cited by examiner

ROLLER-MOUNTED MOTOR VEHICLE DRIVE UNIT

BACKGROUND AND SUMMARY

The invention relates to a roller-bearing-mounted motor vehicle drive system for overcoming motor vehicle driving resistances such as roller resistance, air resistance and the like, and to a motor vehicle having such a drive system.

DE 10 2019 127 242 A1 discloses an electric drive apparatus for a motor vehicle.

A general requirement for the drive of a motor vehicle is that the drive has a long service life and high efficiency. These two properties, or the achievement thereof, can have a negative influence on one another. The invention is discussed below on the basis of a motor vehicle drive system having a gearwheel transmission, the gearwheels of this transmission having what is known as an involute toothing. Although such a toothing has low sensitivity to a deviation from the planned axis spacing (known as axis spacing error), a rigid (low load-dependent displacement) and efficient bearing arrangement is also advantageous here. Particularly rigid supporting of transmission shafts is achievable with what is known as an adjusted bearing arrangement; however, such a bearing arrangement does not have a low degree of loss, in particular compared to a non-adjusted bearing arrangement.

The invention proposes a roller-bearing-mounted motor vehicle drive system which equally permits a transmission of drive power with high efficiency and low displacement of transmission shafts. This object is achieved by a subject according to the independent claim(s), the dependent patent claims providing preferred developments of the invention. In the invention, it is in particular proposed to take the supporting of the transmission shafts as a whole into account, in order thus to be able to realize an in particular low-displacement and efficient motor vehicle drive system.

In the context of the invention, a motor vehicle drive system should be understood to mean a system for driving a motor vehicle, preferably a passenger car, the drive power for overcoming driving resistances such as the frictional resistance, the roller resistance, the air resistance and what is known as the acceleration resistance being provided by means of an electromechanical energy converter. In the context of the invention, such an electromechanical energy converter should thus be understood to mean an electric drive machine, in particular an electric motor/generator, such an electric drive machine being known in different constructions.

Furthermore, the motor vehicle drive system has a traction transmission apparatus, this transmission apparatus being configured to transmit and adapt drive power to a load requirement of the motor vehicle, which results in particular from the driving resistances. The traction transmission apparatus is thus configured to transmit drive power in the form of rotation speed and torque to a motor vehicle axle drive. Here, this motor vehicle axle drive should be understood in particular to mean a motor vehicle drive axle, in particular a front or rear axle. The traction transmission apparatus has a traction transmission housing device, in particular the traction transmission housing device consists of multiple components and is preferably also configured to receive the electric drive machine. A traction transmission drive shaft is rotatably mounted in this traction transmission housing, this traction transmission drive shaft being able to be interpreted, in relation to a transmission of power from the electric drive machine to the motor vehicle axle drive, what is known as the motor drive direction, as a first transmission shaft or as an input shaft into the traction transmission apparatus.

In a first embodiment of the invention, the traction transmission drive shaft is connected for conjoint rotation to the electric drive machine, is preferably oriented coaxially with respect thereto and is further preferably coupled for conjoint rotation directly thereto. In a further embodiment, the traction transmission drive shaft is selectively connectable for conjoint rotation to the electric drive machine, preferably by means of a clutch device. In particular, a permanently rotationally conjoint connection of the electric drive machine to the traction transmission drive shaft makes it possible to save on a bearing point, and a selectively couplable electric drive machine can reduce drag losses.

In addition to the traction transmission drive shaft, the traction transmission apparatus also has a traction transmission intermediate shaft, which, in relation to the motor drive direction, is arranged downstream of the traction transmission drive shaft, preferably this is arranged directly downstream thereof. The traction transmission intermediate shaft is rotatably mounted in the traction transmission housing device and is arranged axially parallel to and at a radial spacing from the traction transmission drive shaft. Furthermore, the traction transmission apparatus also has a traction transmission output shaft, which, in relation to the motor drive direction, is arranged downstream of the traction transmission intermediate shaft, preferably is arranged directly downstream thereof. Furthermore, the traction transmission output shaft is rotatably mounted in the traction transmission housing device and is preferably arranged axially parallel to and at a radial spacing from the two other traction transmission shafts.

To form the traction transmission apparatus, that is to say in particular a transmission apparatus having two gearwheel stages for transmitting power from the electric drive machine to the motor vehicle axle drive, a traction transmission drive gearwheel is arranged on the traction transmission drive shaft and meshes with a first traction transmission intermediate gearwheel arranged on the traction transmission intermediate shaft. The traction transmission drive gearwheel and the first traction transmission intermediate gearwheel thus form with the traction transmission drive shaft and the traction transmission intermediate shaft a first gearwheel stage, by means of which drive power is transmittable from the one of these shafts to the other. A second traction transmission intermediate gearwheel is also arranged on the traction transmission intermediate shaft and meshes with a traction transmission output gearwheel arranged on the traction transmission output shaft. The second traction transmission intermediate gearwheel and the traction transmission output gearwheel thus form with the traction transmission intermediate shaft and the traction transmission output shaft a second gearwheel stage, by means of which drive power is transmittable from the one of these shafts to the other.

The traction transmission housing device has, as main components, a traction transmission housing and a traction transmission cover. In particular, the traction transmission housing and the traction transmission cover are configured to receive roller bearings for rotatably mounting the traction transmission drive shaft, traction transmission intermediate shaft and traction transmission output shaft in relation to the traction transmission housing device. The traction transmission housing is preferably formed in such a way that, in the assembled state of the motor vehicle drive system, in the axial direction of the traction transmission drive shaft, it covers at least one of these gearwheel stages, preferably covers both gearwheel stages. Further preferably, the traction transmission cover is formed as what is known as an end shield. The traction transmission cover may, like the traction transmission housing, be formed as a multi-part component or assembly.

In particular, in order to achieve sufficient stiffness of the bearing arrangement of the transmission shafts (traction transmission drive shaft, traction transmission output shaft, traction transmission intermediate shaft), these three traction transmission shafts are each mounted in the traction transmission housing device by means of what is known as a fixed/floating bearing arrangement. In the context of the invention, a fixed/floating bearing arrangement should be understood in particular to mean a bearing arrangement having two bearing points for a shaft in relation to a housing, one of these bearing points being configured to accommodate axial and radial forces and the other to accommodate radial forces, wherein axial and radial should in each case be understood in relation to the axis of rotation of the shaft to be supported and wherein the bearing point at which the axial forces can be accommodated should be understood as fixed bearing. In this case, a single such bearing point may also have multiple roller bearings, in particular the fixed bearing may have a radial bearing and an axial bearing.

The term "fixed/floating bearing arrangement" as such is known from the prior art. It is thus also proposed that such a fixed/floating bearing arrangement in each case has at least one fixed bearing for accommodating axial forces and that this fixed bearing is arranged in the traction transmission cover, or is borne and positioned in relation to the traction transmission housing by the traction transmission cover. In particular, in the case of such a design of the motor vehicle drive system, simple mounting of the traction transmission apparatus is enabled.

In a preferred embodiment of the invention, the traction transmission drive gearwheel and the first traction transmission intermediate gearwheel mesh with one another for the transmission of drive power and thus form a first traction transmission gearwheel stage.

In a preferred embodiment of the invention, the second traction transmission intermediate gearwheel and the traction transmission output gearwheel mesh with one another for the transmission of drive power and thus form a second traction transmission gearwheel stage.

In a preferred embodiment, at least two gearwheels of the first traction transmission gearwheel stage and the second traction transmission gearwheel stage are formed as helically toothed spur gears, which preferably have what is known as an involute toothing.

The traction transmission drive shaft is mounted in the traction transmission housing device by means of a fixed/floating bearing arrangement, that is to say a bearing arrangement having a fixed bearing at least for accommodating axial forces and a floating bearing. Further preferably, a roller bearing having balls as roller elements is provided as fixed bearing of this fixed/floating bearing arrangement of the traction transmission drive shaft, and further preferably this bearing is formed as what is known as a four-point bearing and preferably as what is known as a deep groove ball bearing. Further preferably, a roller bearing having cylindrical roller elements or preferably having balls is provided as floating bearing of this fixed/floating bearing arrangement of the traction transmission drive shaft. Preferably, this floating bearing is formed as a cylindrical roller bearing and preferably as a deep groove ball bearing. In a preferred embodiment, both the fixed bearing and the floating bearing of the bearing arrangement of the traction transmission drive shaft are formed as deep groove ball bearings. In particular, in an embodiment with such roller bearings, high efficiency during power transmission is achievable. Preferably, the fixed bearing of the bearing arrangement of the traction transmission drive shaft is arranged in the traction transmission cover and in particular fixed therein. Further preferably, the traction transmission housing is formed in such a way that the electric drive machine is arranged on or in the traction transmission housing. In particular, such a design makes it possible to achieve simple mountability of the motor vehicle drive system and high efficiency when transmitting drive power.

The traction transmission intermediate shaft is mounted in the traction transmission housing device by means of a fixed/floating bearing arrangement, that is to say by means of a bearing arrangement having a fixed bearing for accommodating axial forces and a floating bearing. Further preferably, a roller bearing having balls as roller elements is provided as fixed bearing of this fixed/floating bearing arrangement of the traction transmission intermediate shaft, and further preferably this bearing is formed as what is known as a four-point bearing and preferably as what is known as a deep groove ball bearing. Further preferably, a roller bearing having cylindrical roller elements or preferably having balls is provided as floating bearing of this fixed/floating bearing arrangement of the traction transmission intermediate shaft. Preferably, this floating bearing is formed as a cylindrical roller bearing and preferably as a deep groove ball bearing. In a preferred embodiment, both the fixed bearing and the floating bearing of the bearing arrangement of the traction transmission intermediate shaft are formed as deep groove ball bearings. In particular, in an embodiment with such roller bearings, high efficiency during power transmission is achievable. Preferably, the fixed bearing of the bearing arrangement of the traction transmission intermediate shaft is arranged in the traction transmission cover.

The traction transmission output shaft is mounted in the traction transmission housing device by means of a fixed/floating bearing arrangement. Further preferably, this fixed/floating bearing arrangement has, in particular for accommodating axial forces, a fixed bearing, or a fixed bearing point, and at least one floating bearing. Preferably, the fixed/floating bearing arrangement for supporting the traction transmission output shaft has more than two roller bearings, wherein the roller elements of at least two of these roller bearings are formed as cylindrical roller elements and these roller bearings are thus preferably formed as cylindrical roller bearings. Preferably, the fixed/floating bearing arrangement of the traction transmission output shaft also has, in addition to two cylindrical roller bearings, a roller bearing formed as a fixed bearing, preferably a roller bearing having balls as roller elements. Further preferably, the fixed bearing of the bearing arrangement of the traction transmission output shaft is formed as a deep groove ball bearing, preferably as a four-point bearing. This fixed bearing is in particular radially free, or in other words the bearing seat, configured to receive this fixed bearing, on the traction transmission output shaft has a smaller diameter than a bearing inner ring of this fixed bearing, or further preferably the bearing seat, configured to receive this fixed bearing, in the traction transmission housing device has a greater diameter than the bearing outer diameter of this fixed bearing. Further preferably, these cylindrical roller bearings of the fixed/floating bearing arrangement of the traction transmission output shaft are arranged in an axial direction on different sides of the traction transmission output gearwheel.

Further preferably, the fixed bearing, that is to say in particular the deep groove ball bearing or the four-point bearing, of the bearing arrangement of the traction transmission output shaft is arranged in the traction transmission cover. In particular, such a design makes it possible to realize efficient and stable supporting of the traction transmission output shaft.

Individual features and embodiments of the invention will be discussed in more detail below on the basis of the figures.

DETAILED DESCRIPTION OF THE DRAWINGS

Figure 1:
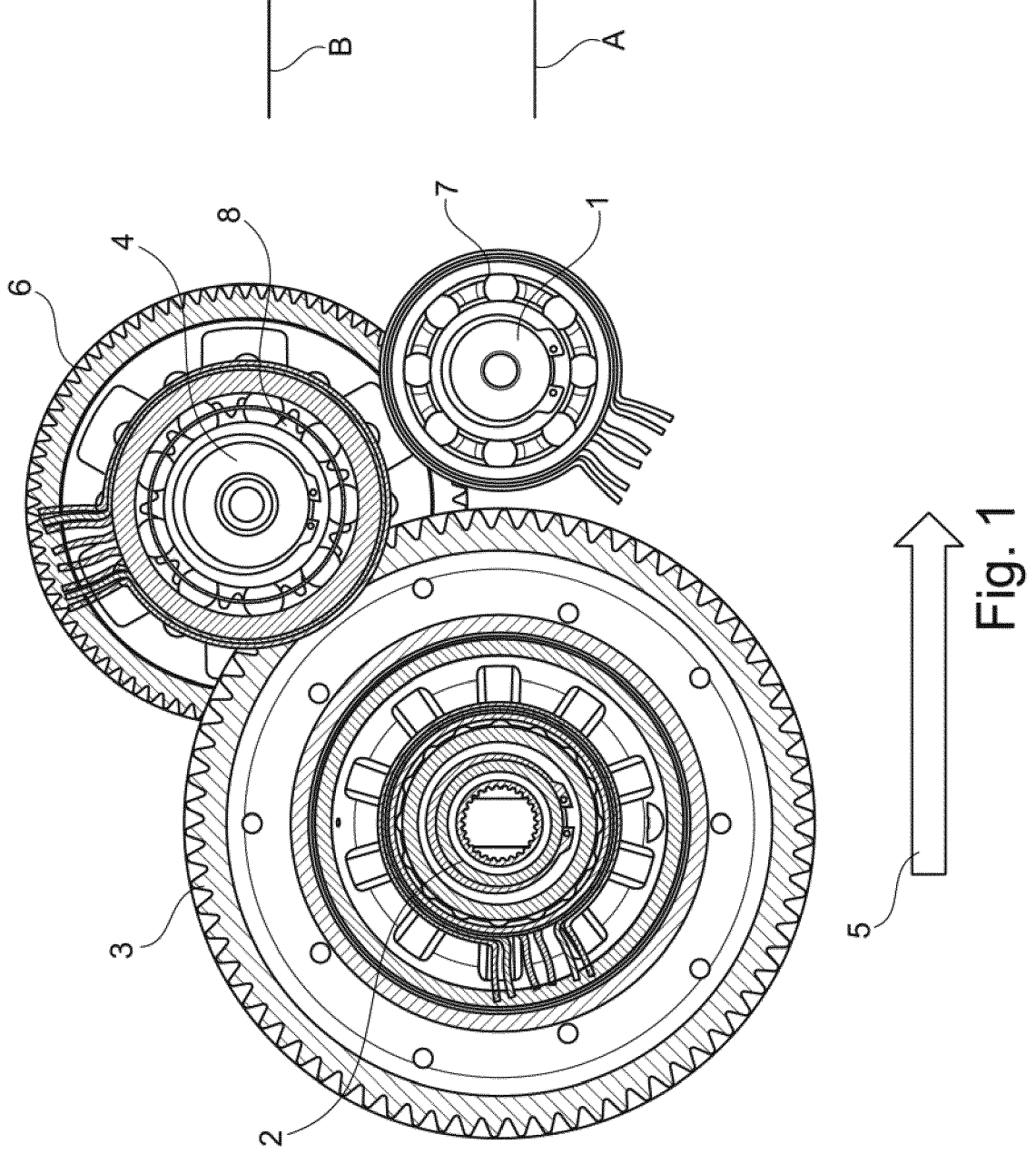
FIG. 1 is a schematic cross-sectional illustration of the proposed motor vehicle drive system orthogonally with respect to the traction transmission drive shaft.

FIG. 1 shows a cross section through a motor vehicle drive system, that is to say a section orthogonal to the traction transmission drive axle 1 at the height of the gear set of the traction transmission. In the case of such a motor vehicle drive system, the electromechanical energy converter is embodied as an electric drive machine (not illustrated). From the electric drive machine, drive power for driving a motor vehicle is transmittable via the traction transmission apparatus (illustrated in section) to a motor vehicle axle drive, in particular to the traction transmission output axle 2 and the traction transmission output gear wheel 3. The traction transmission drive shaft 1 and the traction transmission output shaft 2 of the traction transmission apparatus are rotatably mounted in the traction transmission housing device (not illustrated). The traction transmission drive shaft 1 is connected for conjoint rotation to the electric drive machine by means of a shaft/hub connection.

Furthermore, the traction transmission apparatus has the traction transmission intermediate shaft 4, which is also rotatably mounted in the traction transmission housing device. The transmission shafts of the traction transmission apparatus are each arranged axially parallel to one another and at a radial spacing from one another and, in the present case, are illustrated in the planned installation position in a motor vehicle. Furthermore, the planned direction of forward travel 5 is shown in relation to this installation situation. A traction transmission drive gearwheel is arranged on the traction transmission drive shaft 1 and meshes with a first traction transmission intermediate gearwheel 6. The traction transmission drive gearwheel is not visible in the sectional illustration shown, since this lies behind the traction transmission drive shaft fixed bearing 7. Furthermore, a second traction transmission intermediate gearwheel 8 is arranged on the traction transmission intermediate shaft 4 and meshes with the traction transmission output gearwheel 3 arranged on the traction transmission output shaft 2.

The illustrated three traction transmission shafts (traction transmission drive shaft 1, traction transmission intermediate shaft 4, traction transmission output shaft 2) are each mounted in the traction transmission housing device by means of a fixed/floating bearing arrangement. A bearing arrangement of this type as such is known from the prior art for the supporting of transmission shafts and has at least one fixed bearing for receiving axial forces. In the proposed motor vehicle drive system, at least two of these fixed bearings are arranged in the traction transmission cover, which forms together with the traction transmission housing the traction transmission housing device.

Figure 2:
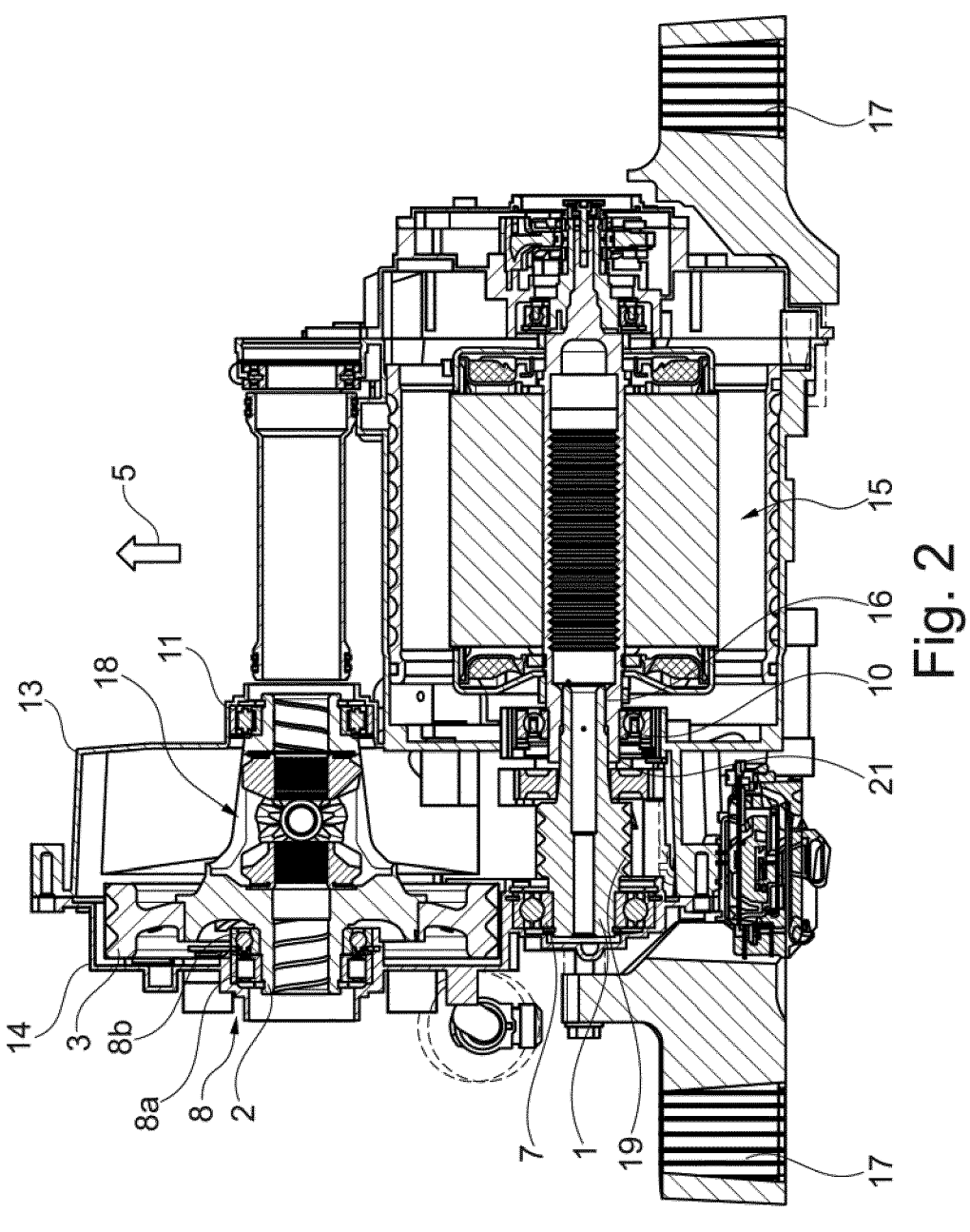
FIG. 2 is a first longitudinal sectional illustration of the proposed motor vehicle drive system parallel to the traction transmission drive shaft.

FIG. 2 illustrates a longitudinal sectional illustration of the motor vehicle drive system, the section plane A in FIG. 1 being visible. The drive power is provided by the electric drive machine 15, which is received in the traction transmission housing device 13, 14, the traction transmission housing device being illustrated only in part.

The output shaft of the electric drive machine 15 is connected for conjoint rotation directly to the traction transmission drive shaft 1 by way of a shaft/hub connection 16. The traction transmission drive shaft 1 is rotatably mounted in the traction transmission housing device 13, 14. The traction transmission drive shaft fixed bearing 7 is arranged in the traction transmission cover 14 and accommodates axial forces occurring at the traction transmission drive shaft 1. Furthermore, the traction transmission drive shaft 1 is mounted in the traction transmission housing 13 by way of the traction transmission drive shaft floating bearing 10. In terms of construction, the traction transmission drive shaft floating bearing 10 is embodied as a common bearing of the electric drive machine 15 and of the traction transmission drive shaft 1, wherein centering of the drive shaft of the electric drive machine 15 and of the traction transmission drive shaft 1 is achieved by way of a traction transmission drive shaft centering seat 21, a bearing arrangement having three bearings can thus be used for the supporting of these two shafts and thus improved efficiency compared with independent supporting of both shafts with in each case two roller bearings is achievable.

The traction transmission drive gearwheel 19, which is arranged on the traction transmission drive shaft 1, meshes with the first traction transmission intermediate gearwheel, which is not illustrated in this sectional illustration, for the transmission of drive power. The traction transmission housing device 13, 14 is connected to the motor vehicle structure (not illustrated) by way of the assembly bearing 17 and is thus positioned in the motor vehicle.

By way of the traction transmission intermediate shaft, which is not in the illustrated section plane A and therefore is not illustrated in FIG. 2, drive power is transmitted from the traction transmission drive shaft 1 to the traction transmission output shaft 2. The traction transmission output gearwheel 3 is arranged on the traction transmission output shaft 2, is formed as a final drive gearwheel and transmits the drive power to the axle differential 18. The traction transmission output shaft 2 is rotatably mounted in the traction transmission housing device 13, 14 by way of a fixed/floating bearing arrangement. The fixed-bearing device 8 of the traction transmission output shaft 2 is received in the traction transmission cover 14 and has a traction transmission output shaft radial bearing 8a and a traction transmission output shaft axial bearing 8b. The traction transmission output shaft axial bearing 8b is radially free in relation to the traction transmission cover 14, such that it transmits no radial forces between the traction transmission output shaft 2 and the traction transmission cover, furthermore the traction transmission output shaft axial bearing 8b is formed as a four-point bearing and has a common outer ring with the traction transmission output shaft radial bearing 8a, which is formed as a cylindrical roller bearing. The traction transmission output shaft floating bearing 11 is received in the traction transmission housing and is formed as a cylindrical roller bearing. During driving of the motor vehicle in the direction of forward travel 5, favorable force ratios are set by the helical toothings at the traction transmission shaft 1, 2, 4, such that efficient operation of the motor vehicle drive system is enabled.

Figure 3:
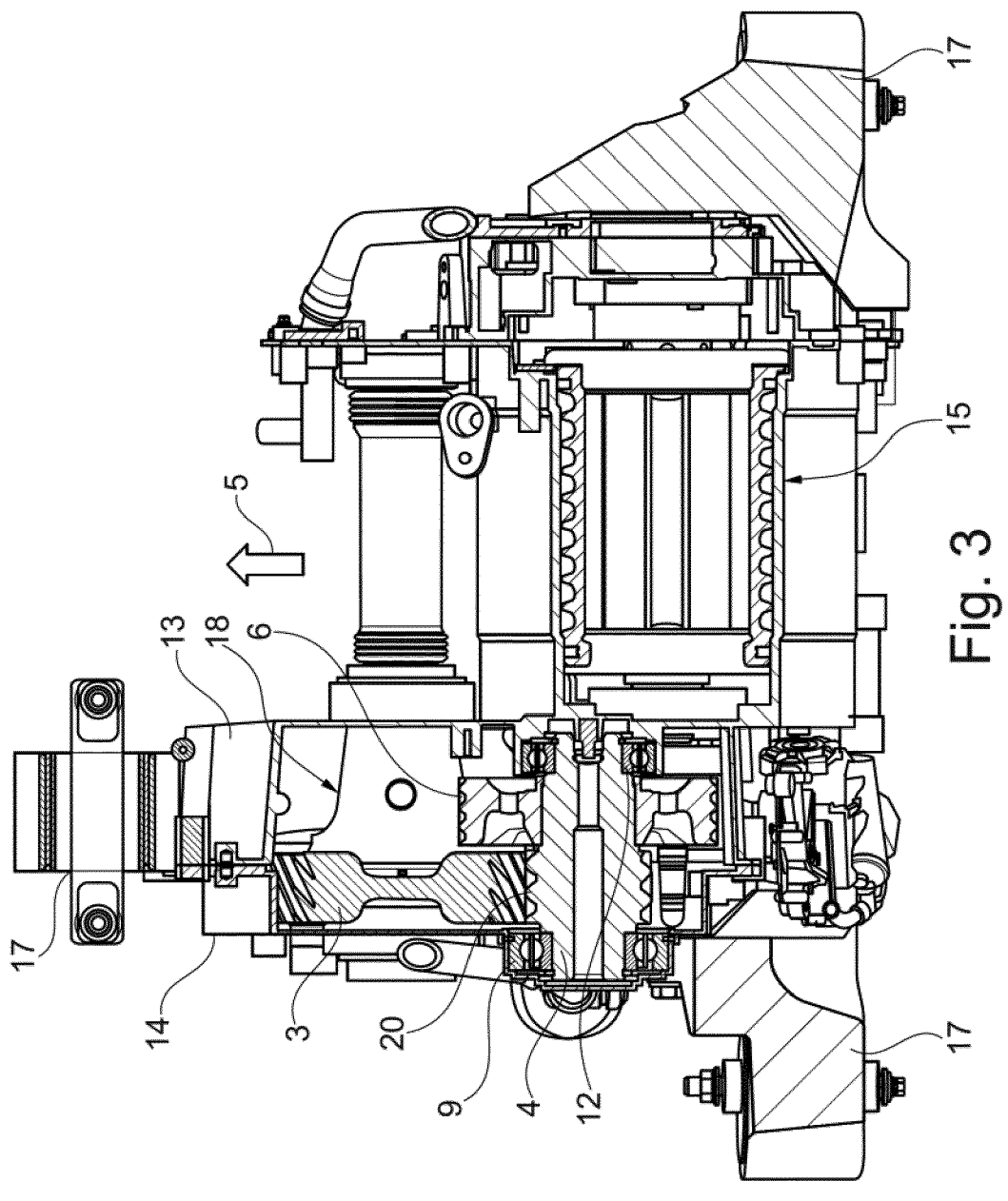
FIG. 3 is a second longitudinal sectional illustration of the proposed motor vehicle drive system parallel to the traction transmission intermediate shaft.

FIG. 3 illustrates a further longitudinal section of the motor vehicle drive system, this longitudinal section illustrating a section in the section plane B (see FIG. 1). The motor vehicle drive system is connected to the motor vehicle structure (not illustrated) by way of the assembly bearing 17 and is configured to drive a motor vehicle in the direction of forward travel 5 and in the opposite direction (rearward). The electric drive machine 15 provides by way of the traction transmission intermediate shaft 4, which is arranged between the traction transmission drive shaft 1 and the traction transmission output shaft 2 in relation to the power transmission from the electric drive machine 15. To transfer the drive power by means of the traction transmission intermediate shaft 4, the latter has the first traction transmission intermediate gearwheel 6 and the second traction transmission intermediate gearwheel 20, the first traction transmission intermediate gearwheel 6 meshing with the traction transmission drive gearwheel 19 and the second traction transmission intermediate gearwheel 20 meshing with the traction transmission output gearwheel 3 for the transmission of power.

The traction transmission intermediate shaft is also mounted in the traction transmission housing device 13, 14 by means of a fixed/floating bearing arrangement, just like the traction transmission drive shaft 1 and the traction transmission output shaft 2, and the fixed bearing is also arranged in the traction transmission cover 14 in the case of the traction transmission intermediate shaft 4. The traction transmission intermediate shaft fixed bearing 9, just like the traction transmission intermediate shaft floating bearing 12, is formed as a deep groove ball bearing. The traction transmission intermediate shaft fixed bearing is configured to accommodate axial forces at the traction transmission intermediate shaft 4 and is, to this end, fixed in the traction transmission cover 14. The traction transmission intermediate shaft floating bearing 12 is received in an axially displaceable manner in the traction transmission housing 13.

LIST OF REFERENCE DESIGNATIONS

| | |
|---|---|
| A | Traction transmission drive shaft section plane |
| B | Traction transmission intermediate shaft section plane |
| 1 | Traction transmission drive shaft |
| 2 | Traction transmission output shaft |
| 3 | Traction transmission output gearwheel |
| 4 | Traction transmission intermediate shaft |
| 5 | Direction of forward travel |
| 6 | First traction transmission intermediate gearwheel |
| 7 | Traction transmission drive shaft fixed bearing |
| 8 | Traction transmission output shaft fixed-bearing device |
| 8a | Traction transmission output shaft radial bearing |
| 8b | Traction transmission output shaft axial bearing |
| 9 | Traction transmission intermediate shaft fixed bearing |
| 10 | Traction transmission drive shaft floating bearing |
| 11 | Traction transmission output shaft floating bearing |
| 12 | Traction transmission intermediate shaft floating bearing |
| 13 | Traction transmission housing |
| 14 | Traction transmission cover |
| 15 | Electric drive machine |
| 16 | Shaft/hub connection between 15 and 1 |
| 17 | Assembly bearing |
| 18 | Axle differential |
| 19 | Traction transmission drive gearwheel |
| 20 | Second traction transmission intermediate gearwheel |
| 21 | Traction transmission drive shaft centering seat |

8

The invention claimed is:

1. A motor vehicle drive system, comprising:
an electromechanical energy converter as an electric drive machine; and
a traction transmission apparatus for transmitting drive power to a motor vehicle axle drive,
wherein the traction transmission apparatus comprises:
a traction transmission housing device, wherein a traction transmission drive shaft is rotatably mounted in the traction transmission housing device and is connected for conjoint rotation, or is selectively connectable for conjoint rotation, to the electric drive machine,
a traction transmission intermediate shaft, which is rotatably mounted in the traction transmission housing device and which is arranged axially parallel to and at a radial spacing from the traction transmission drive shaft, and
a traction transmission output shaft, which is rotatably mounted in the traction transmission housing device and which is arranged axially parallel to and at a radial spacing from the two other traction transmission shafts,
a traction transmission drive gearwheel is arranged on the traction transmission drive shaft and meshes with a first traction transmission intermediate gearwheel arranged on the traction transmission intermediate shaft, and
a second traction transmission intermediate gearwheel is arranged on the traction transmission intermediate shaft and meshes with a traction transmission output gearwheel arranged on the traction transmission output shaft, and
wherein the traction transmission housing device has a traction transmission housing and a traction transmission cover,
wherein the three traction transmission shafts are each mounted in the traction transmission housing device via a fixed/floating bearing arrangement, and said bearing arrangements comprise in each case a fixed bearing for accommodating axial forces and in each case at least one floating bearing configured exclusively for accommodating radial forces,
wherein said three fixed bearings are arranged in the traction transmission cover, and
wherein at least three of said floating bearings are arranged in the traction transmission housing.

2. The motor vehicle drive system according to claim 1, wherein
at least one of, or all of, the floating bearings of the traction transmission intermediate shaft, the traction transmission output shaft and the traction transmission drive shaft are formed as a cylindrical roller bearing.

3. The motor vehicle drive system according to claim 1, wherein
in the bearing arrangement of the traction transmission drive shaft, both the fixed bearing and the floating bearing of said bearing arrangement are formed as deep groove ball bearings.

4. The motor vehicle drive system according to claim 1, wherein
in the bearing arrangement of the traction transmission intermediate shaft, both the fixed bearing and the floating bearing of said bearing arrangement are formed as deep groove ball bearings.

5. The motor vehicle drive system according to claim 1, wherein the bearing arrangement of the traction transmission output shaft has a first and a second cylindrical roller bearing, wherein said cylindrical roller bearings are arranged in an axial direction of the traction transmission output shaft on different sides of the traction transmission output gearwheel, and the fixed bearing of said bearing arrangement is formed as a deep groove ball bearing or as a four-point bearing.

* * * * *